April 30, 1968    L. W. FIERBAUGH ET AL    3,381,269
SAFETY PARK AND IGNITION SIGNAL DEVICE FOR VEHICLES
Filed Dec. 3, 1965    2 Sheets-Sheet 1
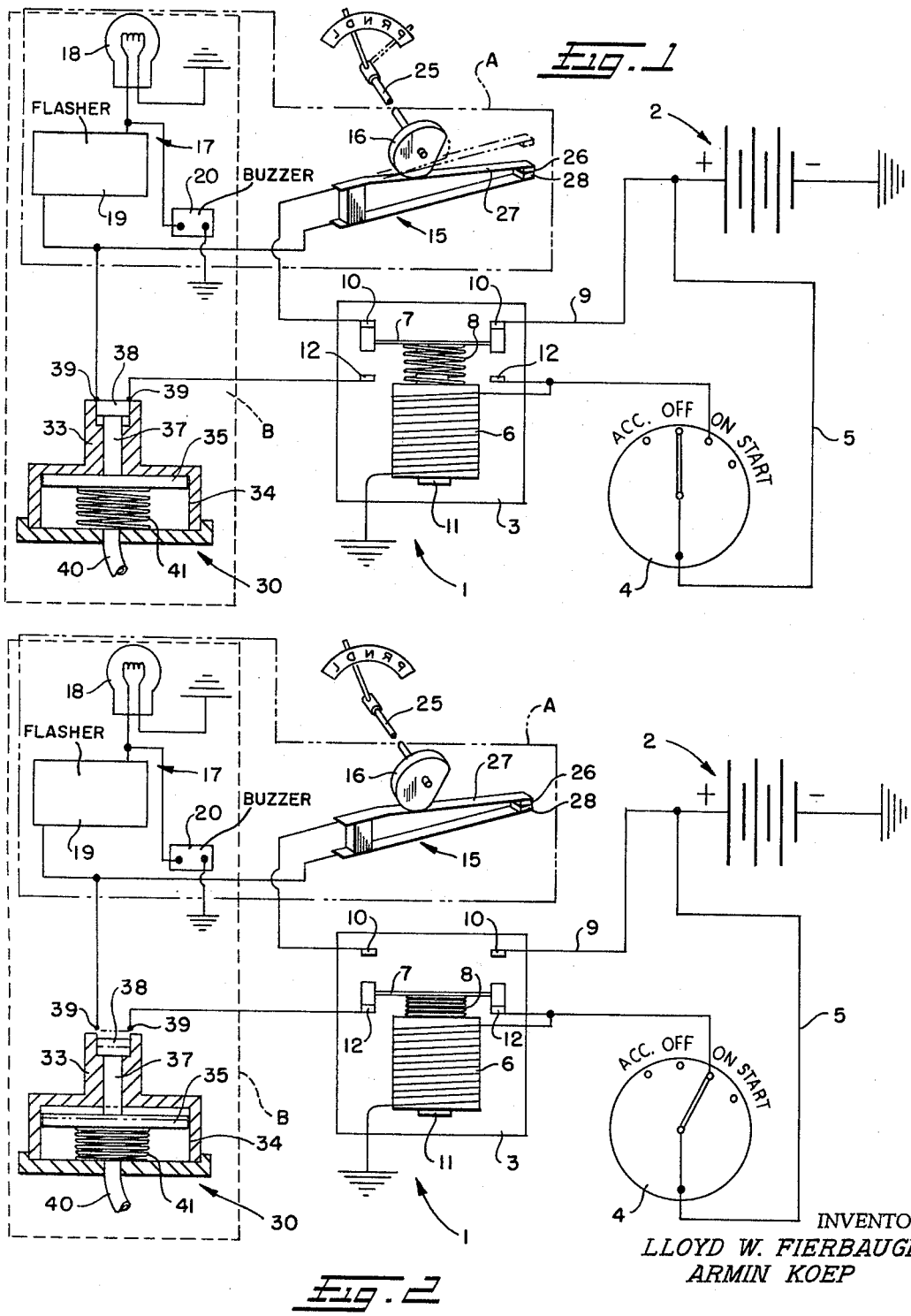
INVENTORS
LLOYD W. FIERBAUGH
ARMIN KOEP
BY *Oberlin, Maky & Donnelly*
ATTORNEYS

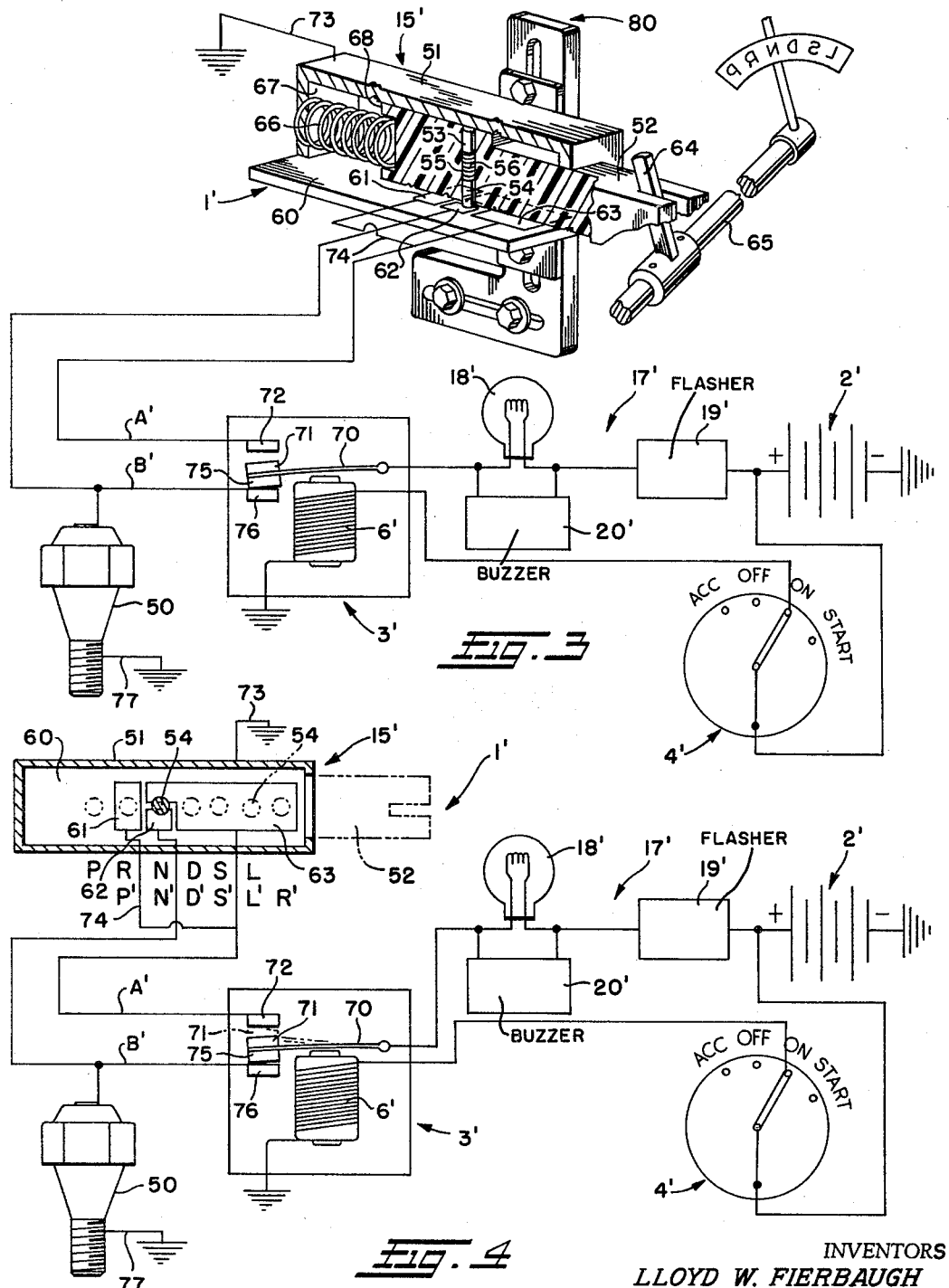

Patented Apr. 30, 1968

3,381,269
SAFETY PARK AND IGNITION SIGNAL
DEVICE FOR VEHICLES
Lloyd W. Fierbaugh and Armin Koep, Ashland, Ohio, assignors of one-third to Emmett A. Fierbaugh
Continuation-in-part of application Ser. No. 474,027, July 22, 1965. This application Dec. 3, 1965, Ser. No. 517,143
13 Claims. (Cl. 340—52)

ABSTRACT OF THE DISCLOSURE

A signal device for vehicles having automatic transmissions including a signal emitting device which is actuated by a control switch to give a warning whenever the ignition switch is off and the gearshift lever is out of the park position and in neutral or any one of a plurality of operating positions. The gearshift lever has a cam thereon which controls the movement of a movable element of the control switch into and out of engagement with a stationary element.

Disclosure

The present invention is a continuation-in-part of our co-pending application Ser. No. 474,027, filed July 22, 1965, now abandoned, and relates generally, as indicated, to a safety park and ignition signal device especially of the type which is adapted to be installed on vehicles such as automobiles and trucks or the like for signalling when the ignition switch is on but the motor is not running and also for signalling when the ignition switch is off but the transmission, if automatic, is not in the park position, or if it is a standard transmission, that the emergency brake is not set. In one form of the invention, the device also signals when the motor is running and the transmission is in the neutral position.

Oftentimes for one reason or another a vehicle is parked and the ignition switch is left on, even though the engine is not running. Not only does this place a heavy drain on the vehicle battery, but it can result in severe burning of the distributor points, especially if the points are closed, which is usually the case when an engine is stopped. Also, the engine sometimes stalls while driving, as when the vehicle is stopped at an intersection. In such circumstances, the driver isn't even aware of the situation until he attempts to start moving again. Finding that the motor is dead at that point is a very annoying and frustrating experience, as everyone knows, especially when the drivers of the trailing vehicles are impatient to move on. Besides that, stalled vehicles can be the cause of collisions, particularly if the engine stalls while the vehicle is moving and the driver doesn't give the attention he should to what lies ahead and has not been forewarned to restart the engine. Moreover, on occasion a vehicle is left unattended with the motor running and the transmission left in neutral. The inherent danger which this situation presents is obvious, and it especially occurs after a vehicle has been started while the gear shift lever is in the neutral position.

It is therefore a principal object of this invention to provide a signal device for a vehicle which automatically gives a warning signal any time that the engine is not running and the ignition switch is in the on position.

Another object is to provide such a signal device which automatically gives a warnning signal when the engine is running and the gear shift lever is in the neutral position.

In addition to the above difficulties which are frequently encountered, drivers when parking generally remember to turn the ignition switch off but often forget or just don't take the trouble to move the gear shift lever to the park position if the vehicle has an automatic transmission, or to set the emergency brake if the vehicle has a standard or conventional type transmission with no park position. Failure to properly park the vehicle can and on many occasions does result in a runaway vehicle, as when the vehicle is left unattended on a sloping surface. While it is true that certain gears of a conventional transmission, such as reverse and low, will hold a vehicle on slight grades, they will not do so if the grade is steep, and no gear except park on an automatic transmission will lock a vehicle in position on even a very slight grade. It is therefore desirable to provide some means for warning the driver that the vehicle is not properly parked simply by turning the ignition switch off, which is another principal object of this invention.

Still another object is to provide a signal device of the type indicated with two separate electrical circuits, the first including a signal means and a control switch actuated by movements of the gear shift lever or brake lever, and the second circuit including the same signal means and an oil or vacuum switch actuated by the oil pressure or vacuum created by the engine, respectively.

A further object is to provide such a signal device with a relay switch operatively connected to the ignition switch of the vehicle in such a manner that when the ignition switch is off, the first circuit is connected to a power source through the lever actuated control switch, and when the ignition switch is on, the second circuit is connected to such power source when the oil or vacuum switch is in one or the other of its two operating positions.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

In said annexed drawing:

FIG. 1 is a schematic diagram of a preferred form of safety park and ignition signal device in accordance with the present invention showing the positions of the various switches which comprise the device with the ignition switch in the off position;

FIG. 2 is a schematic diagram similar to FIG. 1, but showing the positions of such switches with the ignition switch on; and FIGS. 3 and 4 are schematic diagrams of still another preferred form of such safety park and ignition signal device.

Turning now to the details of the drawing, and first of all to the FIGS. 1 and 2 embodiment, the safety park and ignition signal device illustrated therein by way of example is generally indicated at 1 and comprises two separate electrical circuits A and B which are adapted to be alternately connected to a power source 2, such as the battery of a vehicle, by a relay switch 3 of conventional type, the particular circuit being connected depending on the position of the vehicle ignition switch 4; i.e. either off or on. When the ignition switch 4 is off as shown in FIG. 1, the lead line 5 between the battery 2 and the coil 6 of the relay switch 3 is open, whereby the coil 6 is deenergized and the movable relay contact 7 is urged by a spring 8 into a first position establishing electrical contact between the electrical circuit A and battery 2 through the lead line 9 and a first pair of fixed relay contacts 10. Conversely, when the ignition switch 4 is in the on position as illustrated in FIG. 2, the relay coil 6 is energized through the lead line 5 and ignition switch 4, whereupon the movable contact 7 is pulled by the magnetic field of the relay core 11 against the bias of the spring 8 into a second position establishing electrical contact between the main circuit B and battery 2 through the lead line 5, ignition switch 4, and a second pair of fixed relay contacts 12. As evident, when one of the electrical circuits A or B is in electrical contact with the battery 2, the other electrical circuit is out of contact and vice versa.

The electrical circuit A comprises a control switch 15 which is adapted to be actuated by a cam member 16 or the like, and a signal emitting device 17 preferably comprising a safety light 18 and a conventional flasher unit 19, such as is used in the emergency brake system of an automobile, for causing the safety light 18 to flash when electrical contact is established between the safety light 18 and battery 2 through the control switch 15 and relay 3. While the flashing light 18 is generally thought to be adequate by itself to attract the attention of the driver, it may be desirable also to provide some means for emitting an audible sound, such as a buzzer 20, for example, in parallel with the safety light 18. However, it should be understood that either the light or buzzer could be used alone without departing from the present invention, and the light 18 need not necessarily flash, in which case the flasher unit 19 could be eliminated. Moreover, other types of audible signal means could be used instead, such as a bell, clicker, siren, etc.

The safety light 18, flasher unit 19, and buzzer 20 may be installed at any convenient place under the dashboard or elsewhere in the vehicle, so long as the light is visible and the audible sound emitted by the buzzer can be heard by the driver while sitting in the vehicle. Preferably, an opening is provided in the dashboard of the vehicle through which the safety light 18 can be seen with a transparent red lens covering such opening.

As previously indicated, the electrical circuit A is supplied by power from the vehicle battery 2 when the ignition switch 4 is in the off position. Accordingly, if the control switch 15 is closed when the ignition switch 4 is off, the signal emitting device 17 is actuated, and will emit a signal until the control switch 15 is opened. Thus, by controlling the shape of the cam member 16 and mounting or connecting it to or on the gear shift lever 25 of the vehicle if the transmission is automatic, or connecting it to or on the emergency brake lever if the transmission is standard, the control switch 15 is caused to open only when the vehicle is properly parked with the gear shift lever 25 in the park position or the emergency brake lever set. In all other positions of the gear shift lever 25 or brake lever, the control switch 15 is closed. Therefore, the driver of the vehicle will immediately know he has parked improperly when a warning signal is given off by the signal emitting device 17, and the only way that the driver can stop the signal when the ignition switch is in the off position is to park properly by moving the gear shift lever 25 to the park position or by setting the emergency brake to open the control switch 15.

In the form of control switch 15 illustrated in FIGS. 1 and 2 of the drawing, one of the contacts 26 is mounted on a movable leaf spring 27 which normally holds the contact 26 out of engagement with a fixed contact 28, as shown in phantom lines in FIG. 1. The cam member 16 urges the leaf spring 27 to a position whereat the contacts 26 and 28 are in engagement with each other for all positions of the gear shift lever 25 except park. However, it should be understood that the contacts 26 and 28 could just as easily be urged toward the closed position by the leaf spring 27, in which case the cam member 16 would hold such contacts apart only when the lever 25 is moved to the park position. As is now evident, the electrical circuit A provides a simple and effective means for indicating to the driver when the vehicle which he is driving is not properly parked, whereby the number of accidents caused by improperly parked vehicles should be substantially reduced.

Turning now to the other electrical circuit B, it also preferably includes the same signal emitting device 17 which is in the electrical circuit A, and a control switch 30 for actuating the signal emitting device 17 when the ignition switch 4 is on and the motor is not running. Various types of control switches 30 might be used to sense when the engine is on or off, such as an oil pressure switch, a vacuum switch, an engine compression switch, and a centrifugal switch, to name a few. If the vehicle has a sufficient vacuum reserve, which is usually the case where the windshield wipers are of the vacuum type, it is believed that a vacuum switch is the most satisfactory, since it is relatively simple in construction and inexpensive, can be easily connected to the intake manifold on newer model cars or to the fuel pump vacuum line on older model cars without the need of any special tools, and is quite sensitive to the presence or absence of the vacuum which occurs upon starting and stopping the engine. However, many of the late model cars are provided with electric wipers, and do not have a sufficient vacuum reserve to actuate a vacuum switch. In that case, it is preferred that an oil pressure switch be used.

The switch 30 shown is a vacuum switch and comprises a housing 33 having a chamber 34 therein in which there is disposed a piston 35. Projecting upwardly from the piston 35 is a rod 37 having a contact 38 mounted on the outer end thereof for movement therewith into and out of engagement with a pair of stationary contacts 39. The chamber 34 is connected to the intake manifold on newer model cars or to the fuel pump vacuum line on older models as aforesaid through the hose 40. When the engine is running the vacuum created thereby is sufficient to pull the movable contact 38 out of engagement with the stationary contacts 39, in which case the circuit B is open and no signal is emitted by the signal device 17. However, when the engine is not running there is no vacuum being created by the engine, and thus the piston 35 is urged into the position shown in phantom lines in FIG. 2 by a spring 41 to establish electrical contact between the battery 2 and signal emitting device 17 through the stationary contacts 39, movable contact 38, relay 3, ignition switch 4, and lead line 5. Accordingly, when the ignition switch 4 is on and the engine is dead, the driver will immediately be warned of this condition by the signal being given off by the signal emitting device 17. Therefore, if the driver is stopped at an intersection, he can immediately attempt to start the engine and will not be surprised by a dead engine when it is his turn to go. Moreover, if the vehicle is parked and the driver knows that the engine is not running, he will also be warned by the signal emitting device 17 if the ignition switch 4 is on and that it should be turned off or there will be a substantial drain on the battery and perhaps substantial burning of the distributor points.

The other form of safety park and ignition signal device 1' shown in FIGS. 3 and 4 is quite similar in construction and operation to the FIGS. 1 and 2 embodiment and, accordingly, the same reference numerals followed by a prime (') symbol are used to designate like parts. However, the details of the control switch 15' are quite different, and an oil pressure switch 50 is inserted in the electrical circuit B' instead of a vacuum switch. Moreover, the signal emitting device 17', including the safety light 18' and flasher unit 19' connected in series and the buzzer 20' connected in parallel across the safety light 18', is adapted to be connected to one or the other of the electrical circuits A' or B' through the relay switch 3' depending on whether the ignition switch 4' is in the off or on position, respectively, rather than being directly wired to both of such circuits as in FIGS. 1 and 2. This is a definite advantage, since the current from the battery 2' must first pass through the signal emitting device 17' before flowing through the relay switch 3' and one or the other of the circuits A' and B', whereby the voltage applied across the relay switch 3' and circuit A' or B' is relatively low because of the high voltage drop across the signal emitting device 17'. Accordingly, the size of wire and contacts for the circuits A' and B' may be quite small.

Referring next to the details of the control switch 15', it comprises a metal housing 51 in which there is disposed a slide 52 preferably made of a nonconductive material such as plastic and having a pair of axially aligned brushes 53 and 54 located in a transverse bore 55 in the slide 52 and in electrical contact with each other, such brushes 53 and 54 being urged apart by a spring 56 disposed therebetween into engagement with the housing 51 and a stationary insulating strip 60, respectively. Carried by the strip 60 are a plurality of electrically isolated stationary contacts 61, 62, and 63. The slide 52 is always maintained in engagement with a pin 64 or the like projecting from the operating rod 65 of the gearshift or brake lever 25' as by means of a compression spring 66 disposed between an end 67 of the housing 51 and the adjacent end 68 of the slide. Accordingly, movement of the gearshift lever 25' by the operator of the vehicle will cause a corresponding movement of the slide 52 and brush 54 along the insulating strip 60 into and out of engagement with the various stationary contacts 61, 62, and 63.

The various positions of the brush 54 with respect to the stationary contacts 61-63 as the gearshift lever 25' is moved from one operating position to another is clearly indicated in FIG. 4. In late model cars, the reverse position R generally follows the park position P with the neutral position N next and the drive D, super S, and low L positions following the neutral position in that order. As shown, the brush 54 is in engagement with the elongated contact 63 for the drive positions D, S, and L, in engagement with both contacts 62 and 63 for the neutral position N, in engagement with the contact 61 for the reverse position R, and out of engagement with all of the contacts for the park position P.

When the ignition switch 4' is off, the relay coil 6' is deenergized, whereby the leaf spring 70 returns the movable relay contact 71 into engagement with the stationary contact 72 (phantom lines, FIG. 4) so as to place the signal emitting device 17' and battery 2' in the circuit A' which is connected to the stationary contact 63 of the control switch 15'. Under these conditions, should the gearshift lever 25' be in any one of the forward operating positions D, S, or L or even in the neutral position N, the brush 54 will be in engagement with the contact 63 and complete the circuit through the other brush 53 and housing 51 which is grounded at 73, whereby a signal will be emitted by the signal emitting device 17' and will continue to be emitted until the circuit is broken by moving the gearshift lever 25' and thus the brush 54 to the park position, as in the FIGS. 1 and 2 embodiment. The same signal is emitted should the gearshift lever 25' be moved to reverse, since the reverse contact 61 is also connected to the circuit A' by a line 74 or the like.

In older model cars, the neutral position N' often follows the park position P' with the drive positions D', S', L' and R' following in that order, as depicted in FIG. 4. Under these circumstances, the brush 54 engages the stationary contact 61 when the gearshift lever 25' is in the park position P'. Accordingly, the line 74 must be cut when the signal device 1' is used with older model cars or a signal will also be emitted when the vehicle is properly parked. Otherwise, the operation of the signal device 1' with older model cars is substantially the same as previously described except that reverse R' is also located on the contact 63.

The safety park and ignition signal device 1' additionally emits a signal when the ignition switch is on and the engine is stopped, similar to the FIGS. 1 and 2 embodiment. However, the manner in which the circuit for the signal emitting device 17' is completed is somewhat different. When the ignition switch 4' is on, the relay coil 6' is energized, which creates a magnetic field for drawing the leaf spring 70 downwardly, breaking the connection between the movable contact 71 and stationary contact 72 of the circuit A' and closing the connection between the movable contact 75 and stationary contact 76 in the circuit B'.

While the engine is running, the oil pressure is generally sufficient to keep the oil pressure switch 50 open. When the engine dies, however, the oil pressure is lost and the oil pressure switch 50 closes, thus completing the circuit B' through the grounded connection 77 and causing the signalling device 17' to emit the desired signal warning the driver that the engine is no longer running. Accordingly, regardless of what position the gearshift lever 25' may be in, so long as the ignition is on and the motor is stopped, a signal will be emitted. On the other hand, when the motor is running, the circuit B' is not grounded through the oil pressure switch 50, it being held open due to the oil pressure which is then present as aforesaid, and accordingly no signal will be emitted, that is, unless the gearshift lever 25' is in the neutral position N or N'. In that position, the circuit B' is completed through the stationary contact 62 which is connected to such circuit, the brushes 54, 53, housing 51, and ground 73. This is an important feature, since the driver is warned that the vehicle is in neutral and that it should not be left unattended without first moving the gearshift lever to the park position. Far too often has the leaving of a car or other such vehicle in neutral with the motor running resulted in a runaway vehicle. This especially occurs after the vehicle has been started in neutral, which is possible with a great many makes of cars.

The relay 3 or 3', like the signal emitting device 17 or 17', may be installed at any convenient place under the dash. Moreover, if a vacuum switch 30 is used, it may be installed anywhere under the hood at a place convenient to the intake manifold of the engine or to the fuel pump vacuum line. If an oil pressure switch 50 is used, it must be connected somewhere in the oil pressure system for the vehicle. The control switch 15 or 15', too, may be located under the hood at any place convenient to the operating rod of the gearshift or brake lever. A bracket such as shown at 80 in FIG. 3 or the like may be used for adjustably mounting the control switch 15' with respect to the gearshift lever 25' to make sure that the brush 54 engages both contacts 62 and 63 when the gearshift lever 25' is in the neutral position. Of course, all of the various switches of the safety park and ignition signal device 1 or 1' may be installed on the vehicle by the manufacturers as original equipment or just as easily sold as kits to be installed by the purchasers of the vehicles, or by mechanics.

While the signal device 1 or 1' of the present invention is especially adapted to be installed on automobiles and trucks, it should be understood that it could be mounted on other vehicles as well, such as fork lift trucks, bulldozers, tractors and the like.

From the above, it can now be seen that the various forms of safety park ignition signal devices described herein are very simple in construction and yet quite effective for indicating to a driver when the vehicle is not properly parked and the ignition switch is off, and also indicating when the engine of the vehicle is not running and the ignition is on. Besides this, one form of the signal device of the present application also lets the driver know when the motor is running and the gearshift lever is in the neutral position. Not knowing these various conditions in the past has resulted in numerous accidents, to say nothing of the drain on the battery and the burning of the distributor points which is caused when the ignition switch is left on with the motor not running.

Other modes of applying the principles of the invention may be employed, change being made as regards the details described, provided the features stated in any of the following claims or the equivalent of such be employed.

We therefore, particularly point out and distinctly claim as our invention:

1. A signal device for indicating when the ignition switch of a vehicle having an automatic transmission is off and the gearshift lever is out of the park position, comprising a signal emitting device, and means operative automatically to actuate said signal emitting device in response to such ignition switch being off and the gearshift lever out of the park position and in neutral or any one of a plurality of running positions.

2. The signal device of claim 1 wherein said last-mentioned means comprises a control switch, and means responsive to the movements of said gearshift lever to any position except park to actuate said control switch.

3. The signal device of claim 2 wherein said means associated with the gearshift lever as aforesaid comprises a cam means mounted on said gearshift lever for movement therewith, said control switch having a stationary element and a movable element which is movable into and out of engagement with said stationary element by said cam means.

4. The signal device of claim 2 wherein said control switch comprises an electrically conductive housing, a non-conductive slide mounted for movement in said housing, a pair of brushes carried by said slide and in electrical contact with each other, one of said brushes always being in electrical contact with said housing, means for effecting movements of said slide in response to movements of said gearshift lever, and a first stationary contact connected to said signal emitting device and engaged by the other of said brushes when said slide is in an operating position other than park to actuate said signal emitting device as aforesaid.

5. The signal device of claim 1 further comprising a pair of switch means connected to said signal emitting device, one of said switch means being adapted to be closed in response to the engine of such vehicle being stopped, and the other of said switch means being adapted to be closed in response to such gearshift lever being in any position except park, and means for establishing electrical contact between said one switch means and a power source when the ignition switch is on, and for establishing electrical contact between the other switch means and such power source when such ignition switch is off.

6. The signal device of claim 5 wherein said last-mentioned means comprises a relay having a movable contact element which is urged into a first position establishing electrical contact between such power source and one of said switch means when such ignition switch is off, and which is urged into a second position establishing electrical contact between such power source and the other of said switch means when such ignition switch is on.

7. The signal device of claim 5 wherein said one switch means comprises a vacuum switch which is held open by the vacuum created when such engine is running, but which is provided with means for closing said vaccum switch when there is an absence of a vacuum.

8. The signal device of claim 5 wherein said one switch means comprises an oil pressure switch which is held open by the oil pressure when the engine is running, but which is closed when the oil pressure is lost as when the engine stops.

9. The signal device of claim 1 further comprising means operative automatically to actuate said signal emitting device in response to such ignition switch being on and the gearshift lever in the neutral position.

10. The signal device of claim 4 further including means operative automatically to actuate said signal emitting device in response to such ignition switch being on and the gearshift lever in the neutral position, said last-mentioned means comprise a second stationary contact electrically isolated from said first stationary contact and engaged by said other brush when said gearshift lever is in the neutral positon, and relay means for connecting said signal emitting device to said first contact when such ignition switch is off and to said second contact when such ignition switch is on.

11. The signal device of claim 10 wherein both of said contacts are engaged by said other brush when said gearshift lever is in the neutral position.

12. The signal device of claim 6 wherein said signal emitting device is located between said relay and power source, whereby the voltage applied across said relay and switch means is reduced by the full voltage drop across said signal emitting device.

13. A signal device for indicating when the ignition switch of a vehicle is off and the emergency brake is disengaged comprising a signal emitting device, and means operative to actuate said signal emitting device when the ignition switch is off and the emergency brake lever is released comprising a pair of switch means connected to said signal emitting device, one of such switch means being adapted to be closed in response to the engine of such vehicle being stopped, and the other of said switch means being adapted to be closed in respone to the emergency brake lever being released, and means for establishing electrical contact between said one switch means and a power source when the ignition switch is on and for establishing electrical contact between said other switch means and such power source when such ignition switch is off.

References Cited
UNITED STATES PATENTS

| | | | |
|---|---|---|---|
| 1,173,592 | 2/1916 | McConnell | 340—52 |
| 2,773,249 | 12/1956 | De Santis | 340—52 |

JOHN W. CALDWELL, *Primary Examiner.*

ALVIN H. WARING, *Examiner.*